(12) United States Patent
Diachina et al.

(10) Patent No.: US 8,670,339 B2
(45) Date of Patent: Mar. 11, 2014

(54) IMPLICIT REJECT RESPONSE

(75) Inventors: John Diachina, Garner, NC (US);
Daniel Widell, Vikbolandet (SE); Eric Nordström, Stockholm (SE); Mårten Sundberg, Stockholm (SE); Paul Schliwa-Bertling, Ljungsbro (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 335 days.

(21) Appl. No.: 13/051,043

(22) Filed: Mar. 18, 2011

(65) Prior Publication Data
US 2012/0093008 A1 Apr. 19, 2012

Related U.S. Application Data

(60) Provisional application No. 61/393,559, filed on Oct. 15, 2010.

(51) Int. Cl.
*H04W 4/00* (2009.01)
*H04J 3/00* (2006.01)
*H04W 40/00* (2009.01)
*H04W 24/00* (2009.01)
*H04B 7/00* (2006.01)

(52) U.S. Cl.
USPC ........... 370/252; 370/230; 370/329; 370/331; 370/336; 370/345; 455/426; 455/428; 455/456; 455/511; 455/515

(58) Field of Classification Search
USPC ......... 455/426, 428, 456–466, 511, 515, 518, 455/567; 370/230, 329, 331, 336, 345–350
See application file for complete search history.

(56) References Cited

U.S. PATENT DOCUMENTS

2002/0039904 A1* 4/2002 Anderson ...................... 455/456
2003/0186694 A1* 10/2003 Sayers et al. ............... 455/426.1
2010/0248771 A1* 9/2010 Brewer et al. ................. 455/518

FOREIGN PATENT DOCUMENTS

WO WO2011119680 * 9/2011 .............. H04W 4/14

OTHER PUBLICATIONS

Vodafone: "On the Need for New Establishment Causes for Devices Configured for MTC-LTE",3GPP Draft; R2-105484, 3rd Generation Partnership Project (3GPP), Mobile Competence Centre ; 650, Route Des Lucioles ; F-06921 Sophia-Antipolis Cedex; France, vol. RAN WG2, no. Xi'an; 20101011, Oct. 4, 2010, XP050452477, [retrieved on Oct. 4, 2010].

(Continued)

*Primary Examiner* — Jung Park
*Assistant Examiner* — Chuong M Nguyen

(57) ABSTRACT

A wireless communication network having received-priority access requests on an access channel issues an implicit reject response on a grant channel, such as a flag or other value embedded in an explicit access grant or explicit access reject response. The implicit reject response applies to some or all outstanding low-priority access requests. At the expiration of a terminal's grant channel monitoring window, if it has detected an applicable implicit reject response but not an explicit response, the terminal will refrain from transmitting another access request for a predetermined or configurable duration. The implicit reject response may comprise a flag, or a value that implicitly rejects only a fraction of the outstanding low-priority access requests. The implicit reject response may comprise a duration that the terminal must wait prior to transmitting another access request, and may direct the terminal to directly monitor the grant channel without transmitting a subsequent access request.

26 Claims, 4 Drawing Sheets

(56) References Cited

OTHER PUBLICATIONS

Vodafone Group Plc: "M2M overload control", 3GPP Draft; G2-100336, 3rd Generation Partnership Project (3GPP), Mobile Competence Centre ; 650, Route Des Lucioles ; F-06921 Sophia-Antipolis Cedex ; France, no. Vienna, Austria, Oct. 19-22, 2010, Oct. 13, 2010 XP002667120 Retrieved from the Internet: URL:http://www.3gpp.org/ftp/tsg_geran/Wg2_Protocol Aspects/GERAN2_47bisVienna/Docs/ [retrieved on Jan. 13, 2012].

* cited by examiner

IMPLICIT REJECT RESPONSE

This application claims priority to U.S. Provisional Patent Application Ser. No. 61/393,559, titled, "Implicit Immediate Assignment Reject," filed Oct. 15, 2010, the disclosure of which is incorporated herein by reference in its entirety.

TECHNICAL FIELD

The present invention relates generally to access control in a wireless communication network, and in particular to an implicit access rejection applicable to pending low-priority network access requests.

BACKGROUND

The ubiquitous growth of wireless communication networks in many areas has the potential to extend wireless data communications far beyond the traditional mobile voice (cellphone) and/or data (smartphone) terminals. As wireless communication network capabilities, capacity, and coverage increase, and as wireless transceiver chip sets and software are more widely and economically available, wireless communications become a viable option for a broad range of systems and devices.

In anticipation of this movement, and to facilitate its implementation, Machine Type Communications (MTC) has been defined as a specific type of wireless communication network traffic. See, e.g., 3GPP Technical Report 23.888, "System Improvements for Machine-Type Communications," the disclosure of which is incorporated herein by reference in its entirety.

In anticipation of a dramatic proliferation of MTC devices, efforts are underway to mitigate radio interface signaling capacity limitations in existing networks. One aspect of capacity limitation is system access. A brief review of conventional system access signaling follows.

To join a wireless communication network (e.g., to place a voice call, access the internet, or the like), a wireless terminal, such as a cellphone or smartphone, sends an access request message on an access channel. In some protocols, the access request message may be a Channel Request message, and the access channel may be a Random Access Channel (RACH). The access request includes a randomly generated bit sequence which, together with the rest of the information provided within the access request is referred to in some protocols as the Request Reference information. The Request Reference is used for identification purposes during contention resolution and provides some degree of uniqueness for the accessing wireless terminal in lieu of a larger identifier such as the IMSI. The Request Reference thus minimizes the amount of information the wireless terminal must send during the initial part of a contention resolution process. The wireless terminal then monitors a grant channel, such as the Access Grant Channel (AGCH) for a response, for a predetermined monitoring duration, or "window."

The network may either accept or deny the access request. If it accepts it, the network transmits an explicit access grant response on the grant channel, identifying the wireless terminal by its corresponding random bit sequence (e.g., Request Reference information) and directing it to a traffic channel. In some protocols, the explicit access grant response may be an Immediate Assignment (IA) message. If the network denies access to the requesting wireless terminal, it transmits an explicit access reject response, such as an Immediate Assignment Reject (IAR) message. Current system implementations allow the IAR message to indicate up to four specific wireless terminals that have been rejected, by including the corresponding random bit sequence value for each. As one non-limiting example, access signaling, including IA and IAR messages, is defined for the GSM/EDGE protocols in 3GPP TS 44.018, "Radio Resource Control (RRC) protocol," the disclosure of which is incorporated herein by reference in its entirety.

If a wireless terminal receives an explicit access reject response within its monitoring window, it waits a first predetermined duration (e.g., starts a "reject" timer) before transmitting another access request message on the access channel. If the wireless terminal receives neither an explicit access grant nor an explicit access reject response within the monitoring window, it waits a second duration (e.g., starts a "no response" timer) before transmitting another access request message on the access channel. To reduce the potential for collisions during subsequent access attempts, at least the second duration may be a randomly generated number, within a predetermined range of values. By imposing these "wait" durations on non-accepted wireless terminals, current systems include some measure of protection against capacity limitations due to a large number of closely spaced system accesses attempted on the access channel.

Conventional wireless communication network access protocols suffer at least two significant deficiencies—inherently limited rejection capacity, and a lack of priority discrimination. As mentioned above, an explicit access reject response (e.g., IAR) can include up to four random bit sequences (e.g., Request References), allowing each such transmission to reject up to four requesting wireless terminals. In a given access window, such as a 1 second time frame, a network node such as a base station may issue approximately thirty explicit access response messages on the grant channel (either access grant or access reject responses). Even in the extreme case that all of the responses are rejections, the network is limited to being able to reject only about 120 requesting wireless terminals during this 1 second time frame. However, in some environments, thousands or even tens of thousands of MTC devices may be requesting network access within a single access window. Hence, for the vast majority of these requests, the network must rely on the predefined "no response" delay to forestall subsequent access requests, since it can only explicitly reject a small fraction of current requests. The conventional "no response" delay (or maximum delay for randomly generated values) is fairly short, as the access request is presumptively associated with real-time user interaction.

The second problem with conventional systems, at least in the face of the MTC device onslaught, is that, since there is no provision for handling different priority requests differently, all requests are de facto high-priority or will at least be treated as having the same priority level. Wireless communication networks were designed, and have evolved, to service real-time user interactions, such as voice calls and interactive data transfers. As a result, the default system values for access delay timers are fairly short, so as not to excessively degrade perceived user experience. Many MTC devices, however, will have relatively low-priority network access needs, in the sense that they can tolerate a significant latency (e.g., many minutes, or even hours) in accessing the network.

Exploitation of this latency tolerance for low-priority network access requests, as well as the ability to reject more than a relative handful of pending requests at a time, may significantly relieve network access traffic congestion caused, or exacerbated, by the proliferation of MTC devices.

SUMMARY

According to one or more embodiments of the present invention described and claimed herein, a wireless communication network having received one or more low-priority access requests on an access channel may issue an implicit reject response on a grant channel. The implicit reject response may comprise a flag or other value embedded in an explicit access grant or explicit access reject response. The implicit reject response applies to some or all of the wireless terminals having transmitted low-priority access requests. At the expiration of such a terminal's window for monitoring potential responses to its access request, if it has not received an explicit response, but the implicit reject response applies to it, the wireless terminal will refrain from transmitting another access request for a predetermined or configurable duration. This duration may be considerably longer than the delays applying to a wireless terminal receiving either an explicit reject response or no response. The implicit reject response may comprise a flag applying to all outstanding low-priority access requests, or a value that implicitly rejects a fraction of the outstanding low-priority access requests, based on the random bit sequence value included within its initial access request (e.g., within Request Reference information). The implicit reject response may comprise a duration that the transmitting device must wait prior to transmitting another access request, and may direct the wireless terminal to directly monitor the grant channel for extended periods in search of an explicit response to its initial access request without transmitting an additional access request.

One embodiment relates to a method of responding to wireless communication network access requests from wireless terminals. Network capacity is monitored. High-priority access requests and Low-priority access requests are received on an access channel. One or more explicit access grant or access reject responses are transmitted on a grant channel in response to one or more access requests. In response to network capacity, an implicit reject response transmitted on the grant channel to respond to one or more low-priority access requests, the implicit reject response operative to cause one or more wireless terminals having transmitted a low-priority access request to refrain from transmitting a further access request for a predetermined low-priority request deferral duration.

Another embodiment relates to a node in a wireless communication network. The node includes radio resource handling functionality, and a data communication interface to other network nodes. The node also includes a data communication interface to a network transceiver operative to exchange data with a plurality of wireless terminals via a radio interface, and a controller. The controller is operative to monitor network capacity via the network interface; receive high-priority access requests and low-priority access requests on an access channel via the transceiver interface; and respond to one or more access requests by transmitting, via the transceiver interface, one or more explicit access grant or access reject responses on a grant channel. The controller is further operative, in response to network capacity, to respond to one or more low-priority access requests by transmitting an implicit reject response on the grant channel, the implicit reject response operative to cause one or more wireless terminals having issued low-priority access requests to refrain from issuing further access requests for a predetermined low-priority request deferral duration.

Still another embodiment relates to a method of accessing a wireless communication network by wireless terminal. A low-priority access request message is transmitted on an access channel. A grant channel is monitored, for a predetermined response monitor duration, for explicit access grant or access reject responses. An implicit reject response is received on the grant channel. In response to the implicit reject response, at the expiration of the response monitor duration, if neither an explicit access grant nor an explicit access reject response directed to the wireless terminal has been detected, the wireless terminal refrains from transmitting another low-priority access request message on the access channel for a predetermined low-priority request deferral duration.

Yet another embodiment relates to a wireless terminal operative in a wireless communication network. The wireless terminal includes a transceiver operative to exchange data with at least one network node and a controller. The controller is operative to transmit, via the transceiver, a low-priority access request message to a network node on an access channel, and to monitor, via the transceiver, transmissions by a network node on a grant channel, for a predetermined response monitor duration, for explicit access grant or access reject responses. The controller is further operative to receive, via the transceiver, an implicit reject response from the network node on the grant channel, and, in response to the implicit reject response, at the expiration of the response monitor duration, if neither an explicit access grant nor an explicit access reject response directed to the wireless terminal has been detected via the transceiver, the controller is operative to refrain from transmitting another low-priority access request message, via the transceiver, on the access channel for a predetermined low-priority request deferral duration.

DETAILED DESCRIPTION

Figure 1:
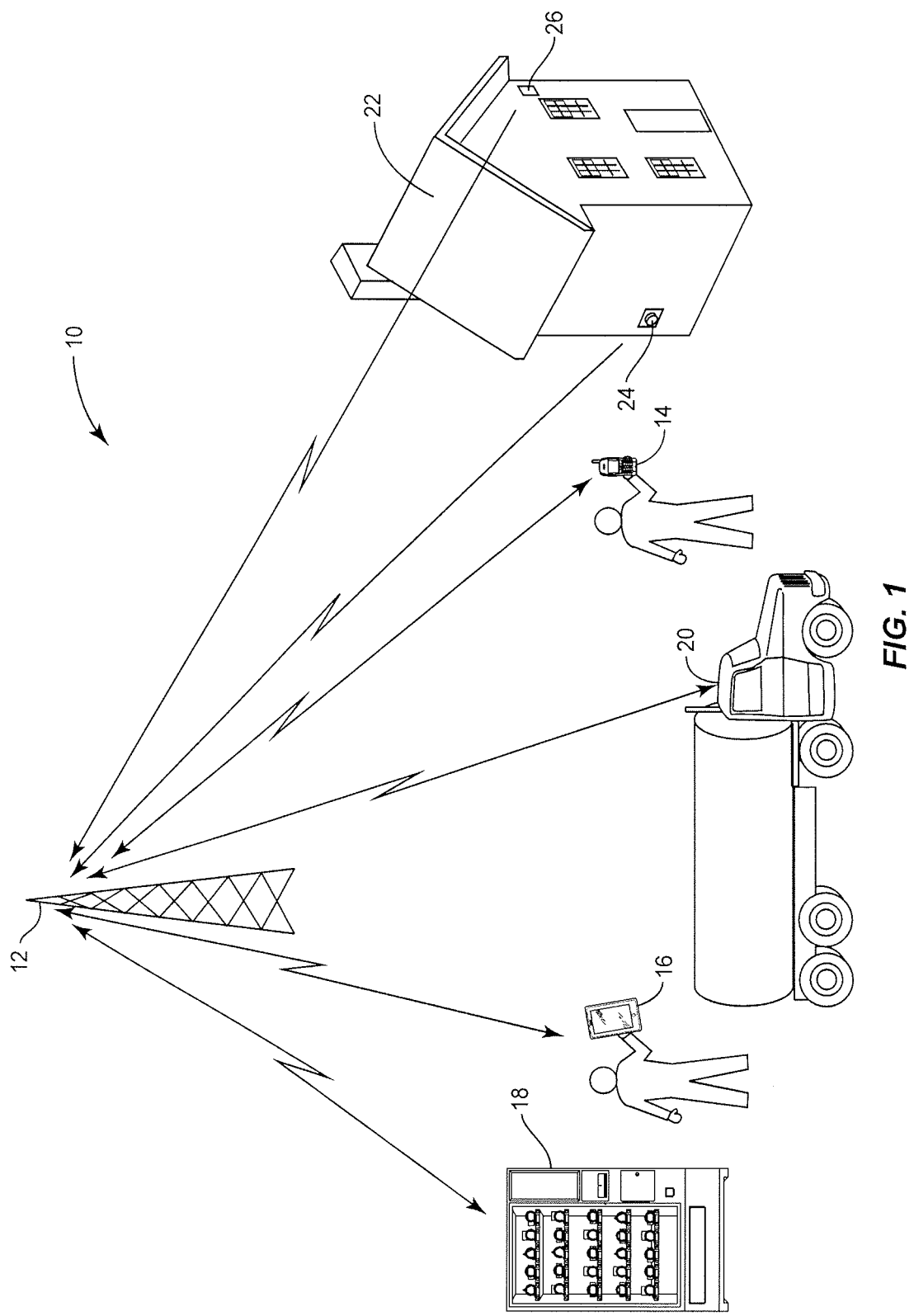
FIG. 1 is a perspective drawing depicting simultaneous access to a wireless communication network from a variety of wireless terminals.

FIG. 1 depicts part of a representative cell of a wireless communication network 10, and some types of wireless traffic. Familiar examples, utilizing well known traffic types, include voice communications over a cellphone 14, and data access (e.g., email, Internet browsing, or the like) over a smartphone or tablet computer 16. One example of a Machine Type Communication (MTC) device is a transceiver 18 embedded in a vending machine, which may notify a server to schedule a service call when its internal inventory of product falls below a threshold. Another example is a transceiver 20 embedded in a truck, which periodically transmits position and telemetry data to a dispatcher or scheduler. Still further examples of MTC devices may be found in a residential or commercial building 22—a transmitter 24 reporting the reading of a utility meter, and a transmitter 26 connected to a fire and/or burger alarm.

The transmitters or transceivers 14, 16, 18, 20, 24, and 26 are collectively referred to herein as "wireless terminals," a term that includes traditional designations such as mobile station, mobile terminal, and User Equipment (UE). The term "wireless terminal" additionally includes MTC devices, which may be mobile or stationary. In general, as used herein a wireless terminal is any device that accesses a wireless communication network 10 via the radio interface of a Radio Access Network (RAN).

The traditional wireless terminals 14, 16 engage in user accesses, and receive the prompt responses designed into conventional wireless communication networks 10. Hence, access requests by wireless terminals 14, 16 are, by default, considered high-priority. However, many access requests by MTC wireless terminals 18, 20, 24 may tolerate significant delay in accessing the network 10; access requests by these devices are considered low-priority. Note that low-priority is not synonymous with MTC devices. For example, while the vehicle position and telemetry transmitter 20 may transmit low-priority requests when deployed on a truck, its access requests may be high-priority (that is, intolerable to significant latency) if deployed in an ambulance. As another example, the meter-reporting access request by transmitter 24 is low-priority, but the fire or burglar alarm-reporting access request by transmitter 26 is high-priority. Indeed, the functionality driving transmitters 24 and 26 may be integrated in many automated building control systems, and a single transmitter may transmit both low- and high-priority network access requests, depending on the nature of the associated data communication.

Access request priority may be indicated by a bit or field in an access request message that a wireless terminal transmits to a network node on an access channel. As one non-limiting example, the Enhanced General Packet Radio Service (EG-PRS) Packet Channel Request Message supports a code point in the One Phase Access that has an associated 2-bit priority field. This priority field may convey up to four priority levels. The priority indication sent by the wireless terminal may depend on factors, such as the wireless terminal device type, the nature of an application giving rise to the wireless communication, and the like. Upon receipt of the wireless terminal's access request message, the network interprets the priority indication and determines whether the access request is a low- or high-priority access request for the purpose of embodiments of the present invention.

As used herein, a low-priority wireless communication network access request is a request for which the acceptable latency of an explicit response from the network exceeds a response-delay threshold typically satisfied for higher priority access requests (e.g. the application in the wireless terminal triggering the access request can tolerate significant delay in conveying the corresponding application payload to its peer application residing in a remote network node). In some embodiments, the response-delay threshold may be predetermined and static; in other embodiments it may vary with environmental factors such as network capacity and loading. In any event, an operative wireless communication network 10 is capable of immediately classifying every network access request transmitted on an access channel as being a low- or high-priority access request.

Figure 2:
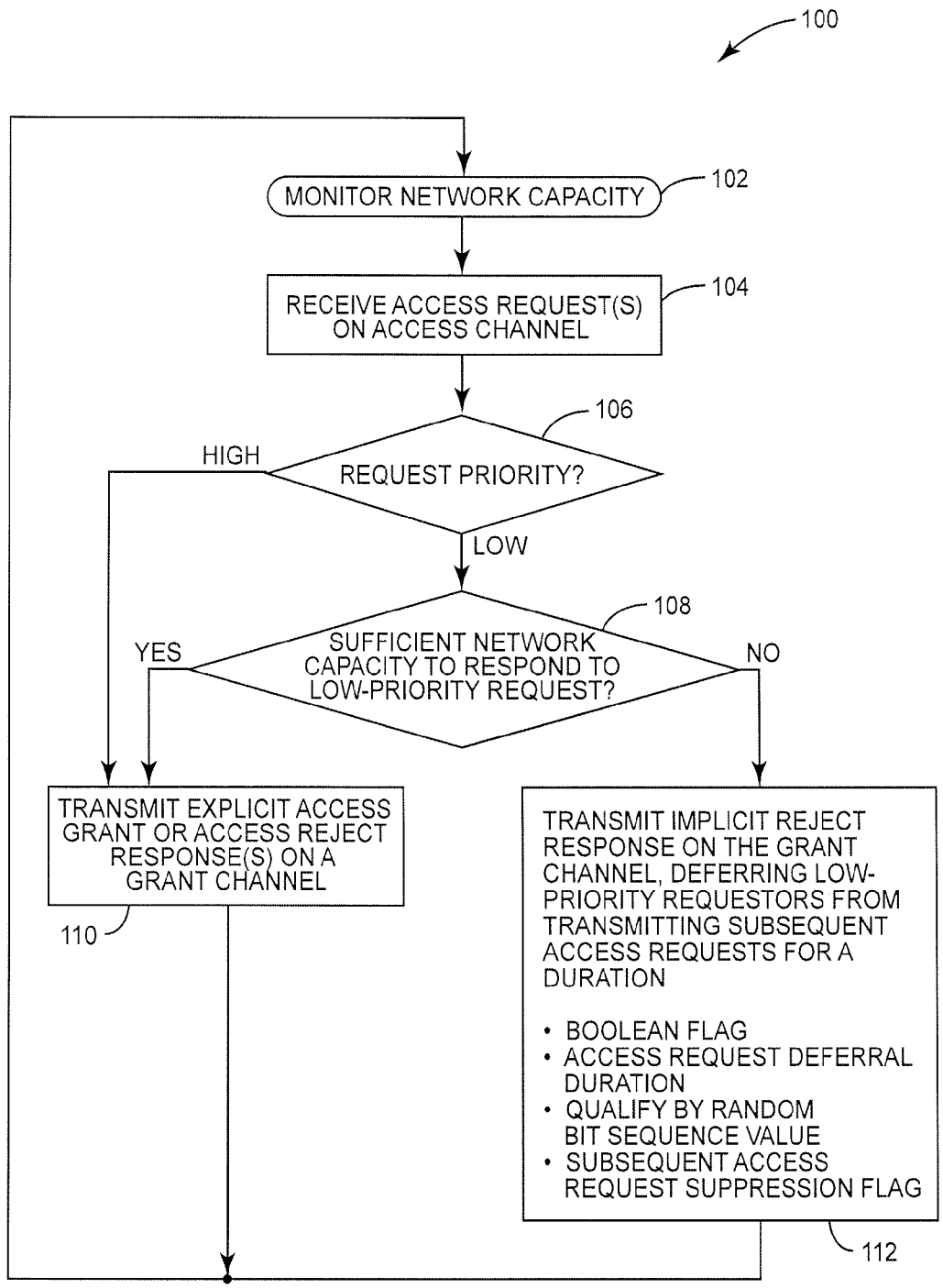
FIG. 2 is a flow diagram of a method of access control by a wireless communication network node.

According to embodiments of the present invention, a wireless communication network node manages its network access traffic according to the method 100 depicted in FIG. 2. Initially, the network node monitors network capacity (block 102), in particular, the network access traffic capacity. Although depicted as a discrete method step, those of skill in the art will recognize that the monitoring process is ongoing and continuous. The network node receives one or more access requests on an access channel (e.g., RACH) (block 104). The network node classifies each access request as low- or high-priority (block 106). If the network access request is a high-priority request (e.g., a conventional access request, such as that associated with a voice call or interactive user data access), the network node transmits an explicit access grant response (e.g., IA) or explicit access reject response (e.g., IAR), depending on network capacity and other factors, on a grant channel (e.g., AGCH) (step 110). The node then continues to monitor the access channel (block 102). If one or more access requests received on the access channel are low-priority requests (block 106), and the node has the capacity to handle them (block 108), they are handled with explicit access grant or access reject responses (block 110), as conventionally known.

If one or more access requests received on the access channel are low-priority requests (block 106), and the network node does not have the capacity to process them or the access request load in general exceeds a certain threshold (block 108), the node transmits an implicit reject response on the grant channel (block 112), and continues to monitor the access channel (block 102). In some embodiments, the implicit reject response is included in an explicit access grant or an explicit access reject response, transmitted on the grant channel and directed to another wireless terminal. The implicit reject response is operative to cause some or all wireless terminals with outstanding low-priority access requests to defer from transmitting a subsequent access request on the access channel for a low-priority request deferral duration. The low-priority request deferral duration may be significantly longer than the default "no response" delay that applies to wireless terminals with outstanding high-priority requests that do not receive an explicit access grant or access reject response. In some embodiments, the default (predetermined) low-priority request deferral duration may be, e.g., several minutes, 15 minutes, 30 minutes, an hour, or several hours. At the expiration of the low-priority request deferral duration, in some embodiments the wireless terminals having outstanding low-priority requests may again transmit access requests on the access channel.

Note that, even if a particular wireless terminal having transmitted a low-priority access request detects an implicit reject response, the wireless terminal will continue to monitor the grant channel for its entire monitoring duration. If the wireless terminal subsequently receives an explicit access grant or access reject response within its monitoring duration, it will respond accordingly, regardless of having detected the implicit reject response. This conditional nature of the response, along with the fact that wireless terminals are not individually identified, is why the response is characterized as "implicit," as opposed to the explicit access grant and access reject responses defined in the prior art.

As indicated in block 112 of FIG. 2, the implicit reject response may take various forms in different embodiments of the present invention, with concomitant different effects on the behavior of wireless terminals having transmitted low-priority access requests. As described in greater detail herein, the implicit reject response may comprise a Boolean flag; an access request deferral duration; a value to qualify, by their random bit sequence identifiers included in their access request, which wireless terminals are implicitly rejected; a flag operative to suppress subsequent transmission of an access request; or combinations of these forms.

Figure 3:
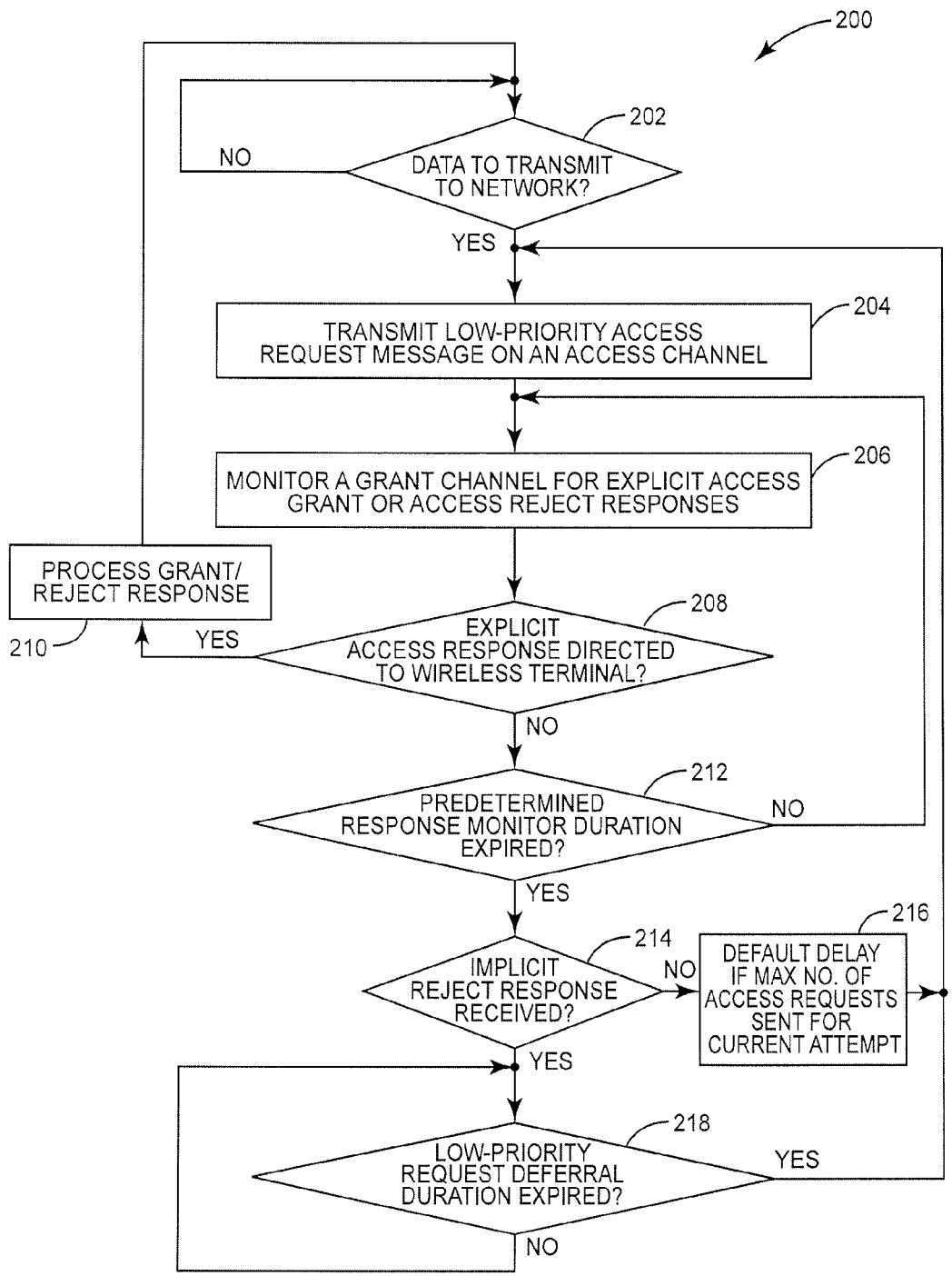
FIG. 3 is a flow diagram of a method of wireless communication network access by a wireless terminal.

A method 200 of accessing a wireless communication network by a wireless terminal transmitting a low-priority access request, and in which the implicit reject response comprises a Boolean flag, is depicted in FIG. 3. A device or system associated with the wireless terminal executes an application that performs some process or monitoring function, the details of which are not relevant here. At some point, the application determines a need exists to transmit data to, or request data from, a remote entity, such as an MTC server, via the wireless communication network (block 202), wherein immediate access to the network is not required (that is, the requesting device or system can tolerate a significant network access latency). The wireless terminal transmits a low-priority network access request on an access channel (e.g., RACH) (block 204). The access request includes a random bit sequence identifier, comprising a randomly generated number within a predetermined range (i.e., a fixed bit-width field). The wireless terminal begins monitoring a grant channel (e.g., AGCH), inspecting each explicit access grant or access reject response for its corresponding random bit sequence identifier (e.g., included its corresponding Request Reference information), and additionally checking each explicit access grant or access reject response for an implicit reject response in the form of a Boolean flag.

If the wireless terminal detects an explicit access grant or access reject response directed to it (block 208), it processes the grant or reject response conventionally (block 210). If the wireless terminal does not detect an explicit access grant or access reject response directed to it (block 208), it continues to monitor the grant channel for a predetermined response monitor duration (block 212). At the expiration of the monitor duration (block 212), if the wireless terminal did not detect an implicit reject response (block 214), and it has transmitted the maximum number of access requests for the current attempt, it waits the conventional "no response" delay (block 216) before again transmitting an access request on the access channel (block 204). The conventional "no response" delay is fairly short, designed to relieve momentary access congestion but still connect interactive users to the network quickly.

If the wireless terminal detected an implicit reject response (block 214)—such as a Boolean flag in a defined bit position in an explicit access grant or access reject response—the wireless terminal waits for a low-priority request deferral duration (block 218), and then again requests access to the network (block 204). The low-priority request deferral duration is a predetermined value, which may be set by the network, such as in a broadcast message, or may be a value unique to each wireless terminal, reflecting the access latency tolerance of its associated application. In any case, the predetermined low-priority request deferral duration is considerably longer than the default "no response" delay applicable to high-priority access requests for which no explicit response was received.

Because all pending wireless terminals inspect each explicit access grant or access reject response for the implicit reject response flag (as well as for their own random bit sequence identifiers), by issuing a single implicit reject response, the network node may defer dozens, hundreds, thousands, or even tens of thousands of wireless terminals from "hammering" the access channel, during times of network congestion. Furthermore, since each wireless terminal monitors the grant channel for a monitoring duration, the network may defer even more low-priority access requests by transmitting an implicit reject response periodically, or by increasing the percentage of explicit access grant or explicit access reject responses sent during a given time interval that includes an implicit reject response.

By transmitting the implicit reject response in forms other than a Boolean flag, the network may exert additional control over the access request behavior of wireless terminals having transmitted low-priority requests.

In one embodiment, the implicit reject response comprises a replacement low-priority request deferral duration. In this embodiment, the implicit reject response may comprise, for example, a multi-bit field defined in the explicit access grant and/or access reject response messages. If the field is empty (e.g., all zero's), the implicit reject response has a null, or non-asserted value. If the field includes a non-zero value, it both serves the purpose of the Boolean flag described above—to broadcast the fact of an implicit reject response—and additionally, the wireless terminals with outstanding low-priority network access requests must adopt the value as their operative low-priority request deferral duration (either directly, or as a value to be loaded into a count-down timer). In this manner, the network node may adjust the severity of the access latency imposed upon low-priority access requests to match prevailing network conditions, such as access traffic congestion.

In one embodiment, the network may implicitly reject some, but not necessarily all, of the pending low-priority network access requests. In this embodiment, the implicit reject response comprises a qualifying value that applies the implicit rejection to a subset of pending low-priority access requests, based on a comparison of the qualifying value provided by the implicit reject response to the random bit sequence included in each access request. The random bit sequence values included in network access request messages vary over a defined range of values, bounded by the bit width of the random bit sequence field. To reject, e.g., half of the wireless terminals having an outstanding low-priority network access request, the network node may set the qualifying value to half of the maximum possible random bit sequence value. The implicit reject response then applies only to those wireless terminals having transmitted a low-priority access request with a random bit sequence value less than the qualifying value (which, in this example, would statistically be half of the outstanding low-priority requests). The affected wireless terminals (if they do not receive an explicit access grant or access reject response within their monitoring duration) will defer from transmitting another access request for the applicable low-priority request deferral duration, as described above.

The wireless terminals having transmitted a low-priority access request with a random bit sequence value greater than or equal to the qualifying value will ignore the implicit reject response, and continue monitoring the grant channel. At the expiration of their monitoring duration, these wireless terminals will wait only the default "no response" duration before again requesting access on the access channel. In this manner, the network node may tailor the extent of an implicit reject response, to better conform the required deferrals to current network conditions, such as the network access traffic capacity. In fact, since each wireless terminal monitors the grant channel for a monitoring duration, the network may gradually increase or decrease the number of implicitly rejected access requests by incrementally changing the qualifying values transmitted in successive implicit reject responses.

In one embodiment, the network may further limit network access traffic by low-priority requestors, by suppressing subsequent access requests. In this embodiment, the implicit reject response comprises a subsequent access request suppression flag, such as a defined bit position in an explicit access grant or access reject response. Upon detecting the implicit reject response in the form of an asserted subsequent access request suppression flag, the wireless terminals with outstanding low-priority access requests will (at the expiration of their monitoring duration and if they have not received an explicit response) defer subsequent accesses for the applicable low-priority request deferral duration, as described above. However, upon the expiration of the applicable low-priority request deferral duration, the wireless terminals will again begin to directly monitor the grant channel for explicit access grant or access reject responses, without first transmitting another access request message on the access channel. In this manner, the network may reduce future access channel traffic from deferred low-priority access requests, of which it is already aware.

Although described herein, for clarity of explanation, as separate embodiments, the various forms of the implicit reject response are not mutually exclusive. For example, an implicit reject response may include both a replacement low-priority request deferral duration and a qualifying value. In this case, only the wireless terminals having transmitted a low-priority access request with a random bit sequence value less than the qualifying value will act on the implicit reject response, and those wireless terminals will utilize the replacement low-priority request deferral duration. As another example, the subsequent access request suppression flag may be a stand-alone implicit reject response, or may accompany any of the other forms of an implicit reject response, suppressing the affected wireless terminals from transmitting future access requests in addition to the behavior dictated by other fields of the implicit reject response, as described above. By combining the various implicit reject response fields described herein, network nodes may employ sophisticated and nuanced strategies for managing network access traffic by potentially very large numbers of wireless terminals transmitting low-priority access requests.

Figure 4:
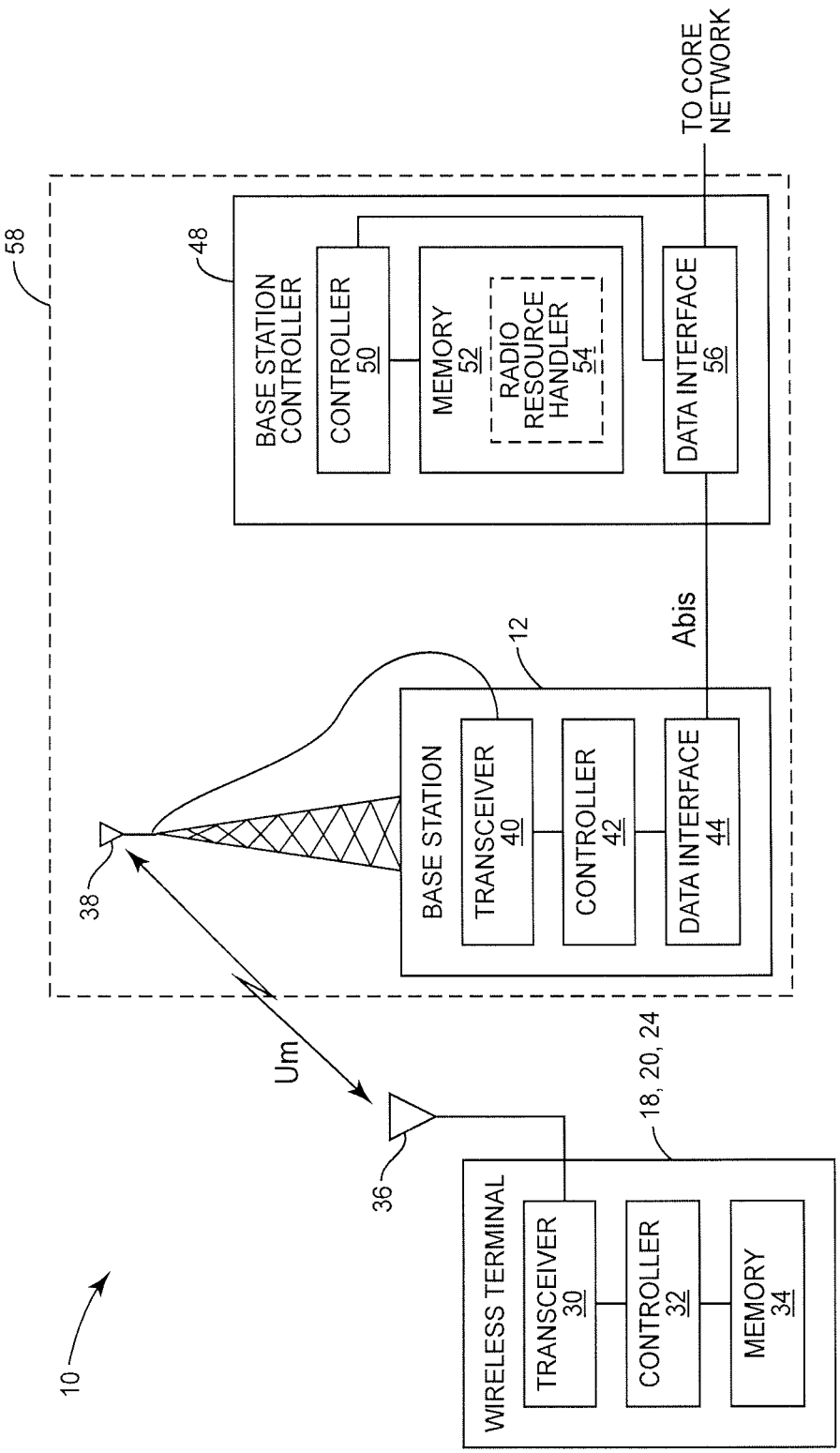
FIG. 4 is a functional block diagram of part of a wireless communication network.

FIG. 4 depicts a portion of the Radio Access Network (RAN) of a representative wireless communication network 10 in which embodiments of the present invention may be realized. A wireless terminal 18, 20, 24 requiring a low-priority access to the network 10 includes at least a transceiver 30 and a controller 32 operatively connected to machine-readable memory 34. The transceiver 30 is operative to exchange data and control messages with the network 10 via an antenna 36 according to one or more protocols (e.g., GSM/EDGE, WCDMA, UTRAN, LTE, or the like). The controller 32 may comprise a stored-program processor or Digital Signal Processor (DSP) executing software instructions stored in memory 34; programmable logic (e.g., FPGA) and concomitant firmware; hardware, such as discrete logic implementing a state machine; or any combination thereof. In particular, the controller 32 is operative to direct the transceiver 30 to establish an operative connection to the network 10; transmit a low-priority network access request on an access channel; monitor a grant channel for explicit access grant or access reject responses; detect one or more implicit reject responses during a predetermined response monitor duration; and take such action(s) in response to the most recently received implicit reject response as described herein. The wireless terminal 18, 20, 24 may be embedded in an MTC device or system, and may include functionality not depicted in FIG. 4 for clarity.

The wireless terminal 18, 20, 24 is operative to exchange messages with a base station 12 (also known as a Base Transceiver Station, eNodeB, and the like) of the network 10, such as via a Um interface operative between the wireless terminal antenna 36 and the base station antenna 38. The base station 12 includes a transceiver 40, controller 42 operatively connected to machine-readable memory (not shown), and data interface 44. The transceiver 40 and controller 42 may be as described above with respect to the wireless terminal 18, 20, 24. The data interface 44 is operative to connect the base station 12 to a base station controller 48 (also known as a Radio Network Controller or RNC) in data communications relationship, such as via an Abis interface. In general, the base station 12 implements the radio interface portion of the RAN of network 10, and it operates under the control and direction of a base station controller 48.

The base station controller 48 includes a controller 50 operatively connected to machine-readable memory 52, and data interface 56. The controller 50 may be as described above with respect to the wireless terminal 18, 20, 24. The memory 52 includes software instructions operative to implement a Radio Resource Handler 54, which controls network access traffic between wireless terminals 18, 20, 24 and base station 12. In particular, the Radio Resource Handler 54 is operative to direct the base station transceiver 40 to transmit an implicit reject response, as described herein. The data interface 56 is operative to connect the base station controller 48 to the base station 12 in data communications relationship, such as via an Abis interface. The data interface 56 (or, in some embodiments, an alternate data interface) is further operative to connect to a core network (not shown), such as to route data communications between wireless terminals 18, 20, 24 and MTC servers or systems (not shown).

In existing or future wireless communication networks 10, some or all of the Radio Resource Handler 54 functionality may be implemented in the base station 12—that is, some or all functionality of the base station controller 48 may merge into the base station 12, as indicated by the dashed line and designated by the number 58. In general, reference herein to a network node may refer to the base station 12, a base station controller 48, or a combination of the base station 12 and base station controller 48 (i.e., the combined network node 58). As such, reference herein to a data communication interface between a controller implementing implicit reject response functionality and a network transceiver may refer to data interfaces 44, 56, or to a direct (e.g., hardwired) connection within a single physical node 58. The network 10 hardware and configuration depicted in FIG. 4 is presented to enable those of skill in the art to make and use embodiments of the present invention without undue experimentation. As such, the depiction is exemplary only, and is not a limitation on the wireless communication networks 10 in which embodiments of the present invention may be advantageously deployed.

The implicit reject response functionality described herein allows a wireless communication network 10 to manage network access traffic in the face of an open-ended number of wireless terminals 18, 20, 24 that have transmitted low-priority network access requests. In particular, the network 10 may direct such wireless terminals 18, 20, 24, or selective fractions thereof, to defer future access request transmissions by a default or specified duration optimized to network access traffic needs. This deferral may be implemented without the risk of degrading perceived user experience for interactive access requests, or the hazards attendant to deferring non-interactive but otherwise high-priority access requests (e.g., fire alarms and the like). Additionally, future access channel traffic may be managed by suppressing the repetition of low-priority access requests. This functionality is expected to be immensely valuable as MTC type wireless terminals proliferate.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of responding to wireless communication network access requests from wireless terminals, comprising:
   monitoring network capacity;
   receiving at least two access requests on an access channel, said access requests being associated with either high-priority or low-priority wireless terminals;
   transmitting an explicit access response message in response to the access request of one of said wireless terminals; and,
   including in the explicit access response message an implicit reject response operative to cause one or more other wireless terminals having transmitted a low-priority access request and monitoring the grant channel for a corresponding network response during a predetermined response monitor duration to refrain from transmitting a further access request for a predetermined low-priority request deferral duration.

2. The method of claim 1, wherein the implicit reject response comprises an implicit reject flag in an explicit access grant or explicit access reject response transmitted on a grant channel.

3. The method of claim 1, wherein the implicit reject response comprises a replacement low-priority request deferral duration included in an explicit access grant or access reject response; and operative to override the wireless terminal's predetermined low-priority request deferral duration.

4. The method of claim 1, wherein
each access request includes a random bit sequence value within a predetermined range; and,
the implicit reject response comprises a qualifying value, within the range of random bit sequence values, included in an explicit access grant or access reject response, and operative to cause only those wireless terminals having transmitted a low-priority request including a random bit sequence value less than the qualifying value, to refrain from transmitting a further access request for the predetermined low-priority request deferral duration.

5. The method of claim 4, wherein the implicit reject response further comprises a replacement low-priority request deferral duration included in the explicit access grant or access reject response, and operative to override the predetermined low-priority request deferral duration for those wireless terminals having transmitted a low-priority request having a random bit sequence value less than the qualifying value.

6. The method of claim 1, wherein the implicit reject response comprises a subsequent access request suppression flag included in an explicit access grant or access reject response, and operative to direct wireless terminals having transmitted low-priority requests, following expiration of a low-priority request deferral duration, to monitor a grant channel for a response, without issuing a subsequent access request on the access channel.

7. The method of claim 1, wherein the explicit access response message is one of an Immediate Assignment message and an Immediate Assignment Reject message, as defined in 3GPP TS 44.018.

8. A node in a wireless communication network, the node including radio resource handling functionality, comprising:
a data communication interface to other network nodes;
a data communication interface to a network transceiver operative to exchange data with a plurality of wireless terminals via a radio interface; and,
a controller operative to:
monitor network capacity via the network interface;
receive at least two access requests on an access channel, said access requests being associated with either high-priority or low-priority wireless terminals;
transmit, via the transceiver interface, an explicit access response message in response to the access request of one of said wireless terminals; and,
include in the explicit access response message an implicit reject response operative to cause one or more other wireless terminals having transmitted a low-priority access requests and monitoring the grant channel for a corresponding network response during a predetermined response monitor duration to refrain from transmitting a further access request for a predetermined low-priority request deferral duration.

9. The node of claim 8, wherein the implicit reject response comprises an implicit reject flag in an explicit access grant or explicit access reject response transmitted on a grant channel.

10. The node of claim 8, wherein the implicit reject response comprises a replacement low-priority request deferral duration included in an explicit access grant or access reject response, and operative to override the wireless terminal's predetermined low-priority request deferral duration.

11. The node of claim 8, wherein:
each access request includes a random bit sequence value within a predetermined range; and,
the implicit reject response comprises a qualifying value, within the range of random bit sequence values, included in an explicit access grant or access reject response, and operative to cause only those wireless terminals having transmitted a low-priority request including a random bit sequence value less than the qualifying value, to refrain from transmitting a further access request for the predetermined low-priority request deferral duration.

12. The node of claim 11, wherein the implicit reject response further comprises a replacement low-priority request deferral duration included in the explicit access grant or access reject response, and operative to override the predetermined low-priority request deferral duration for those wireless terminals having transmitted a low-priority request having a random bit sequence value less than the qualifying value.

13. The node of claim 8, wherein the implicit reject response comprises a subsequent access request suppression flag included in an explicit access grant or access reject response, and operative to direct wireless terminals having issued low-priority requests, following expiration of a low-priority request deferral duration, to monitor a grant channel for a response, without transmitting a subsequent access request on the access channel.

14. The node of claim 8, wherein the explicit access response message is one of an Immediate Assignment message and an Immediate Assignment Reject message, as defined in 3GPP TS 44.018.

15. A method of accessing a wireless communication network by a wireless terminal, comprising:
transmitting a low-priority access request message on an access channel;
monitoring a grant channel, for a predetermined response monitor duration, for an explicit access grant or explicit access reject response;
receiving an explicit access response message to an access request for another terminal, said explicit access response message including an implicit reject response; and,
in response to the implicit reject response, if neither an explicit access grant nor an explicit access reject response directed to the wireless terminal has been detected at the expiration of the response monitor duration, refraining from transmitting another low-priority access request message on the access channel for a predetermined low-priority request deferral duration.

16. The method of claim 15, wherein the implicit reject response comprises an implicit reject flag in an explicit access grant or access reject response transmitted on the grant channel.

17. The method of claim 15, wherein the implicit reject response comprises a replacement low-priority request deferral duration included in an explicit access grant or access reject response, and operative to override the wireless terminal's predetermined low-priority request deferral duration.

18. The method of claim 15, wherein the low-priority access request message includes a random bit sequence value; the implicit reject response comprises a qualifying value; and, if the random bit sequence value is less than the qualifying value, refraining from transmitting another access request for the predetermined low-priority request deferral duration.

19. The method of claim 18, wherein the implicit reject response further comprises a replacement low-priority request deferral duration included in the explicit access grant or access reject response, and operative to override the wireless terminal's predetermined low-priority request deferral duration.

20. The method of claim 15, wherein the implicit reject response comprises a subsequent access request suppression flag included in an explicit access grant or access reject response, and further comprising:
   if no explicit access grant or access reject response directed to the wireless terminal is detected within the response monitor duration, at the expiration of the low-priority request deferral duration, again monitoring the grant channel, for the response monitor duration, for explicit access grant or access reject responses, without transmitting a subsequent access request on the access channel.

21. A wireless terminal operative in a wireless communication network, comprising:
   a transceiver operative to exchange data with at least one network node; and,
   a controller operative to:
      transmit, via the transceiver, a low-priority access request message to a network node on an access channel;
      monitor, via the transceiver, transmissions by a network node on a grant channel, for a predetermined response monitor duration, for an explicit access grant or explicit access reject response;
      receive, via the transceiver, an explicit access response message to an access request for another terminal, said explicit access response message including an implicit reject response; and,
      in response to the implicit reject response, if neither an explicit access grant nor an explicit access reject response directed to the wireless terminal has been detected via the transceiver at the expiration of the response monitor duration, refrain from transmitting another low-priority access request message, via the transceiver, on the access channel for a predetermined low-priority request deferral duration.

22. The wireless terminal of claim 21, wherein the implicit reject response comprises an implicit reject flag in an explicit access grant or access reject response transmitted on the grant channel.

23. The wireless terminal of claim 21, wherein the implicit reject response comprises a replacement low-priority request deferral duration included in an explicit access grant or access reject response, and operative to override the wireless terminal's predetermined low-priority request deferral duration.

24. The wireless terminal of claim 21, wherein the low-priority access request message includes a random bit sequence value, and wherein the implicit reject response comprises a qualifying value, and wherein the controller is further operative to:
   if the random bit sequence value is less than the qualifying value, refrain from transmitting, via the transceiver, another access request for the predetermined low-priority request deferral duration.

25. The wireless terminal of claim 24, wherein the implicit reject response further comprises a replacement low-priority request deferral duration included in the explicit access grant or access reject response, and operative to override the wireless terminal's predetermined low-priority request deferral duration.

26. The wireless terminal of claim 21, wherein the implicit reject response comprises a subsequent access request suppression flag included in an explicit access grant or access reject response, and wherein the controller is further operative to:
   if no explicit access grant or access reject response directed to the wireless terminal is detected within the response monitor duration, at the expiration of the low-priority request deferral duration, again monitoring the grant channel, via the transceiver, for the response monitor duration, for explicit access grant or access reject responses, without transmitting, via the transceiver, a subsequent access request on the access channel.

* * * * *

UNITED STATES PATENT AND TRADEMARK OFFICE
CERTIFICATE OF CORRECTION

| | | |
|---|---|---|
| PATENT NO. | : 8,670,339 B2 | Page 1 of 1 |
| APPLICATION NO. | : 13/051043 | |
| DATED | : March 11, 2014 | |
| INVENTOR(S) | : Diachina et al. | |

It is certified that error appears in the above-identified patent and that said Letters Patent is hereby corrected as shown below:

In the Claims

In Column 11, Line 14, in Claim 3, delete "response;" and insert -- response, --, therefor.

Signed and Sealed this
Twenty-ninth Day of July, 2014

Michelle K. Lee
*Deputy Director of the United States Patent and Trademark Office*